Sept. 4, 1928.
F. H. REYNOLDS
1,683,302
CAMERA COVERING AND METHOD OF MAKING SAME
Filed July 13, 1926
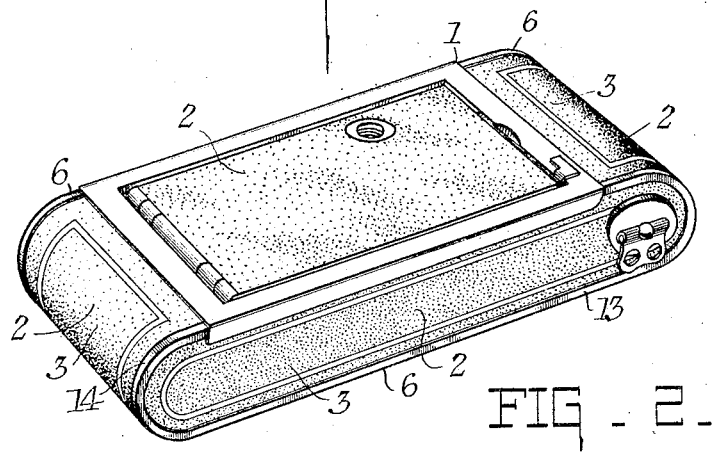
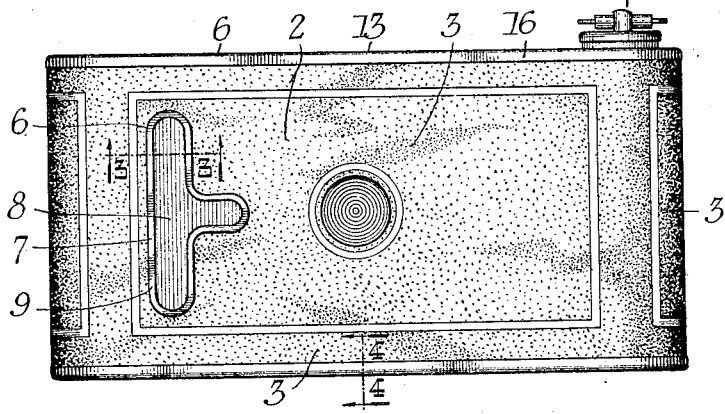
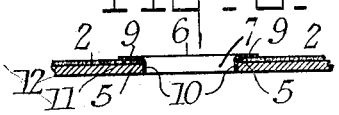
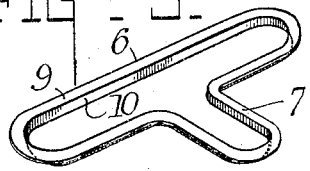
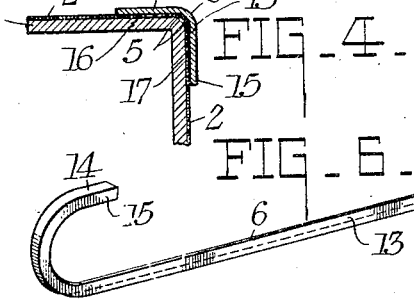
INVENTOR,
Frank H. Reynolds,
BY
ATTORNEYS.

Patented Sept. 4, 1928.

1,683,302

UNITED STATES PATENT OFFICE.

FRANK H. REYNOLDS, OF ROCHESTER, NEW YORK, ASSIGNOR TO EASTMAN KODAK COMPANY, OF ROCHESTER, NEW YORK, A CORPORATION OF NEW YORK.

CAMERA COVERING AND METHOD OF MAKING SAME.

Application filed July 13, 1926. Serial No. 122,263.

This invention relates to photography and more particularly to photographic cameras. One object is to provide a camera covering which is durable and attractive in appearance. Another object is to provide a camera covering which is reinforced at the edges. Another object is to provide a camera covering in which the pieces used for the covering need not be fitted accurately. Another object is to provide a cover binding which completely conceals the joint or edge of the covering sheets. Another object is to provide a cover and binding strip both of cellulosic material which may be easily and securely welded together by means of a common solvent. Another object is to provide a covering in which relatively soft material may be used for the major parts of the camera covering, and in which the edges and parts exposed to wear may be made of harder and more durable material. Still another object is to provide a camera covering in which portions of the body may be covered with grained, roughed or fancy designed material, and a contrasting outlining band of different material may be used to produce a decorative effect. If desired the body portion and the outlining bands may be of contrasting colors. Another object is to provide an edging for a camera covering which will prevent the unfinished covering edges from becoming frayed and ragged in use. Another object is to provide a covering which may be applied by unskilled labor, the edges of the covering sheets need not be fitted and the binding strips, being formed to fit the camera, may be easily applied to cover the edges, thus producing a neat and inexpensive covering, and other objects will appear from the following specification, the novel features being pointed out in the claims at the end thereof.

It is well known that a very satisfactory grained effect can be procured in imitation leathers, and that by looking at the surface it is often difficult to detect the nature of the material. However, no satisfactory way has been devised for finishing the exposed edges of the imitation leather and these show clearly the fabric of which it is made. Leather is finished by burnishing with a heated iron, but imitation leather can not be satisfactorily treated in this way. When an imitation leather covering is formed by several pieces, or when there are exposed edges, these soon wear, fray and pull up from the camera casing, and the appearance of the camera is spoiled. My invention has to do with overcoming these defects in the covering material.

Coming now to the drawings, wherein like reference characters denote like parts throughout:

Fig. 1 is a perspective view of a camera constructed in accordance with and illustrating one embodiment of my invention;

Fig. 2 is a plan view of the back of the camera shown in Fig. 1;

Figs. 3 and 4 are sections on lines 3—3 and 4—4 of Fig. 2;

Fig. 5 is a perspective of a binding strip used on the back of the camera illustrated in the first two figures; and Fig. 6 is a perspective of an end wall binding strip.

As a preferred embodiment of my invention I have shown a well known type of small camera designated broadly as 1. The major portion of this camera, that is the side, front, back and end walls are covered with material 2, this preferably being imitation leather such as is commonly used on such cameras. This material is relatively soft and is preferably provided with a grained or roughened surface diagrammatically illustrated by the dots 3 in the drawings.

The covering 2 may consist of a number of pieces, as, for instance, the sides, back and ends, and the bed may be separate pieces. The edges 5 of these pieces (Figs. 3 and 4) in accordance with my invention need not be accurately fitted to form a neat edge or joint, for I provide binding strips or edges, designated broadly as 6, to cover the edges and thus insure a good looking and strong joint.

As shown in Fig. 5, the binding strip 7 is shaped suitably to fit the opening 8 in the back provided for writing legends on the film such as is well known in the art. As shown in Fig. 3, the strip 7 has two angularly disposed walls 9 and 10, the former being attached or united to an area 11 of the covering 2, and the latter, being of greater width than the thickness of the covering 2, projects down opposite the camera wall 12 completely obscuring the edge of the covering.

In Fig. 6 the binding strip 13 for a side wall is shown, this is made like strip 7 with angularly disposed walls 14 and 15, and covers the edges 16 and 17 of the wall coverings. These walls are both welded to the covering material, providing an even binding strip.

I prefer to form the binding strips 6 of relatively hard smooth cellulosic material as this provides a durable wearing edge for the most used parts of the camera. The smooth shiny band provides also a pleasing contrast to the roughened surface of the covering, and if desired this contrast may be increased by introducing different color combinations for the covering and binding.

I have found that the binding strips may be cemented or united to the covering by applying a common solvent such as wood alcohol. But I prefer to use a little, say 5% of amyl acetate with the alcohol, or equal parts of acetone and wood alcohol with 5 or 10% amyl acetate. However, any of the well known solvents of nitrocellulose products may be employed. I prefer to apply the strip by using the cement and pressure, since this method can be readily applied in production.

While I have shown a preferred embodiment of my invention, obviously the number of pieces required or desired for covering different cameras may vary widely, and the location and number of the binding strips required may also vary. Different shapes of strip may also be provided to suit the individual case. I, therefore, consider as within the scope of my invention, all such modifications as may come within the scope of the appended claims.

Having thus described my invention what I claim as new and desire to secure by Letters Patent is:

1. In a camera, a covering therefor made of cellulosic material, and a cellulosic binding member covering and united to the edges of the cellulosic covering, whereby a reinforced decorative edge is produced.

2. In a camera, a cellulosic covering therefor, having edges and a binding strip for the cover edge comprising a strip of cellulosic material adapted to lie over the edge of and be united to the covering material.

3. In a camera, a cellulosic covering therefor, a binding strip of cellulosic material united to the covering, said binding strip having an angularly disposed flange adapted to produce a finished edge.

4. In a camera, a relatively soft cellulosic covering therefor, and a relatively hard, cellulosic edge binding strip united to the covering to provide a finished edge for the covering.

5. In a camera, a roughened cellulosic covering therefor, and a smooth cellulosic binding strip reinforcing edges of the covering, whereby a decorative effect is produced.

6. In a camera having walls adapted to be covered with material, an imitation leather covering for the camera walls, and a binding member L-shaped in cross section, at least one side of the L-shaped strip being united to the covering.

7. In a camera, a covering material for the camera, and a binding strip having a pair of angularly disposed walls, one wall lying against and united to an area of the camera covering, and the other wall being of greater width than the thickness of the material, forming a flange extending over and obscuring the edge of the covering material.

8. In a camera, the combination of a cellulosic covering, having unfinished edges, a cellulosic binding strip therefor having a pair of angularly disposed walls, one wall being united to the cellulosic covering, and the other wall projecting across the edge of the covering material.

9. A method for covering cameras comprising covering a camera body with a cellulosic covering, having unfinished edges, covering the edges of the cellulosic covering with cellulosic binding strips and uniting the parts with a suitable cement.

10. A method for covering cameras comprising covering a camera body with pieces of cellulosic material, having unfinished edges, obscuring the edges of the pieces with cellulosic binding strips having a pair of angularly disposed walls, and uniting at least one wall of the binding strip to the covering with a suitable cement.

11. A method for covering cameras comprising covering a camera body with pieces of cellulosic material, applying pieces of cellulosic material shaped to the edges of the material with pressure and a common solvent, whereby a reinforced edge is produced.

12. A method for covering cameras comprising covering a camera body with pieces of cellulosic material, applying pieces of cellulosic material L-shaped in cross section over the edges of the material, and cementing at least one side of the L-shaped strip to the covering.

13. In an article of manufacture, a sheet of cellulosic covering material having an unfinished edge, and a binder for the unfinished edge comprising a strip of cellulosic material consisting of two angularly disposed faces, one of said faces being welded to the surface of the cellulosic covering material along the unfinished edge, and the other of said faces, overhanging and covering the unfinished edge of the cellulosic material.

14. In an article of manufacture, a sheet of cellulosic covering material having an unfinished edge and a binder for the unfinished edge comprising a strip of cellulosic material of an angular cross section having a portion thereof welded along the edge of the covering material by means of a common solvent, the other portion of the cellulosic strip being of considerably greater width than the thickness of the covering and overhanging the unfinished edge of the covering material.

Signed at Rochester, New York, this 8th day of July, 1926.

FRANK H. REYNOLDS.